United States Patent
Wooley et al.

(10) Patent No.: US 7,837,325 B2
(45) Date of Patent: Nov. 23, 2010

(54) SHORT CHANNEL PROGRESSIVE ADDITION LENSES

(75) Inventors: C. Benjamin Wooley, Jacksonville, FL (US); Pierre Gerligand, Jacksonville, FL (US); Shyamy Sastry, Roanoke, VA (US); Jing Wang, Eden Prairie, MN (US)

(73) Assignee: Essilor International (Compagnie Generale d'Optique), Charenton le Pont (FR)

( * ) Notice: Subject to any disclaimer, the term of this patent is extended or adjusted under 35 U.S.C. 154(b) by 59 days.

(21) Appl. No.: 11/993,157

(22) PCT Filed: Jun. 19, 2006

(86) PCT No.: PCT/IB2006/002481

§ 371 (c)(1),
(2), (4) Date: Dec. 29, 2008

(87) PCT Pub. No.: WO2007/004070

PCT Pub. Date: Jan. 11, 2007

(65) Prior Publication Data

US 2010/0045931 A1      Feb. 25, 2010

Related U.S. Application Data

(60) Provisional application No. 60/692,067, filed on Jun. 20, 2005.

(51) Int. Cl.
G02C 7/02 (2006.01)
(52) U.S. Cl. .................. 351/177; 351/161; 351/164
(58) Field of Classification Search .......... 351/159–177
See application file for complete search history.

(56) References Cited

U.S. PATENT DOCUMENTS

| 4,952,047 | A | * | 8/1990 | Barth et al. ............... 351/169 |
| 6,106,118 | A | * | 8/2000 | Menezes et al. ........... 351/169 |
| 6,824,268 | B2 | * | 11/2004 | Rubinstein et al. .......... 351/177 |
| 7,021,763 | B2 | * | 4/2006 | Welk et al. ................. 351/177 |
| 2004/0263778 | A1 | | 12/2004 | Wooley |

FOREIGN PATENT DOCUMENTS

| WO | WO97/26579 | 7/1997 |
| WO | WO02/061496 | 8/2002 |
| WO | WO02/084382 | 10/2002 |
| WO | WO2006/009738 | 1/2006 |
| WO | WO2006/026057 | 3/2006 |

* cited by examiner

*Primary Examiner*—Darryl J Collins
(74) *Attorney, Agent, or Firm*—Occhiuti Rohlicek & Tsao LLP

(57) ABSTRACT

Designing a progressive addition lens includes using scaled surface powers and/or cylinder powers of base curves to determine a set of power targets, and using these targets to determine a lens design.

17 Claims, 7 Drawing Sheets

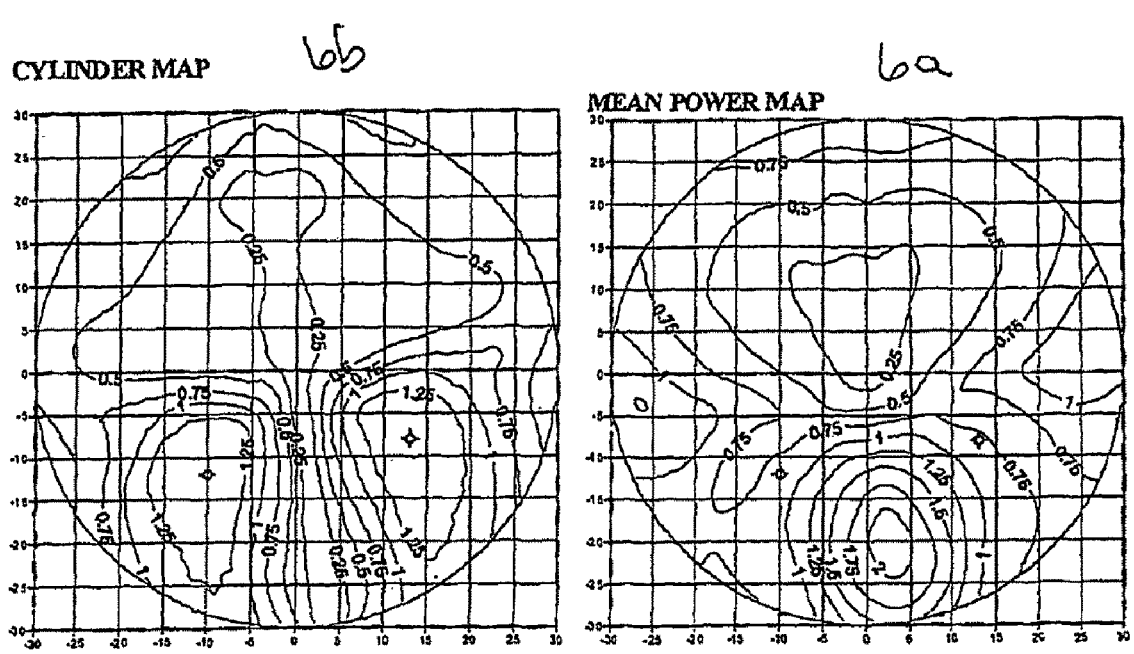
Figure 6. Power and Cylinder maps 2.0D add power.
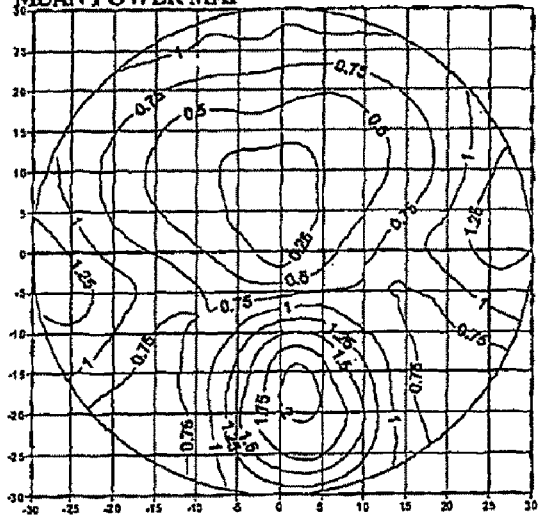
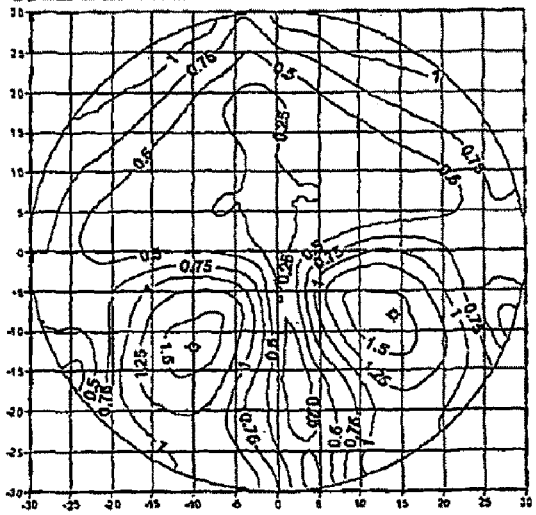
Figure 7. Power and Cylinder maps 2.0D add power.

SHORT CHANNEL PROGRESSIVE ADDITION LENSES

CROSS-REFERENCE TO RELATED APPLICATIONS

This application is the National Stage of International Application No. PCT/IB2006/002481, filed on Jun. 19, 2006, which claims the priority of U.S. Application No. 60/692,067, filed on Jun. 20, 2005. The contents of both applications are hereby incorporated by reference in their entirety.

TECHNICAL FIELD

This invention relates to multifocal ophthalmic lenses, and more particularly to providing progressive addition lens designs with a shortened channel.

BACKGROUND

The use of ophthalmic lenses for the correction of ametropia is well known. For example, multifocal lenses, such as progressive addition lenses ("PALs"), are used for the treatment of presbyopia. PALs have at least one progressive surface that provides far, intermediate, and near vision in a gradual, continuous progression of vertically increasing dioptric power from far to near focus or top to bottom of the lens.

Typical PALs have a 12 to 14 mm in length channel between the fitting point and the point along the prime meridian of the lens at which the power reaches 85% of the lens' add power. Although such a channel helps provide more gradual power changes and lower levels of unwanted astigmatism, the near viewing zone is often cut-off when lenses of these designs are mounted into standard frames, especially frames of smaller diameters.

Some PAL lenses have been designed with shortened channels in the 9 mm to 12 mm range, but these PALs typically have much higher levels of unwanted astigmatism and a shortened intermediate viewing zone. The result of this can be an intermediate viewing zone that is unusable.

SUMMARY

In some aspects of the invention, a method for designing a progressive addition lens comprises using at least one of a plurality scaled surface powers or cylinder powers of a base curve to determine a set of power targets, and determining a first design using at least one of the targets.

In certain embodiments, the method further comprises determining a second design for a progressive addition surface and using the second design to determine at least one of the plurality scaled surface powers or cylinder powers. The scaled surface powers or cylinder powers can be determined from each of a plurality of base curves. The first design can be optimized using at least one of the targets.

In some aspects of the invention, a method for designing a progressive addition lens comprises the steps of: a.) providing a first design for a progressive addition surface; b.) calculating a scaled surface power and scaled cylinder power for each of a plurality of base curves; c.) using the scaled surface and cylinder powers to generate a set of power and cylinder targets; and d.) optimizing the first design using the power and cylinder targets to produce a second, optimized design.

In some embodiments, the scaled surface powers or cylinder powers can be determined according to the equations: $P(x,y)=p(x',y')$ and $C(x,y)=c(x',y')$, wherein $P(x,y)$ is a scaled surface power, $p(x',y')$ is a nominal surface power, $C(x,y)$ is a scaled cylinder power, $c(x',y')$ a nominal cylinder power, $x'=x/x\_scale$, and $y'=(y-shift)/y\_scale+shift$. The x_scale can be about 0.7 to about 1.3 the shift may be about −6 to about 0. The x_scale can be about 1 and the shift is about −3. Determining the design can further comprise optimizing by determining a surface that minimizes the function:

$$MF = \sum_x \left[ \sum_y \left[ \begin{array}{l} w\_p(x,y) \cdot (P(x,y) - \Phi(x,y))^2 + \\ w\_c(x,y) \cdot (C(x,y) - cyl(x,y))^2 \end{array} \right] \right]$$

wherein x and y are points sampled over the surface of the lens, $w\_p(x,y)$ is a power weight, $P(x,y)$ is a scaled surface power, $\Phi(x,y)$ is a surface power calculated at each point x,y, $w\_c(x,y)$ is a cylinder weight, $C(x,y)$ is a scaled cylinder power, and $cyl(x,y)$ is the surface cylinder calculated as each point $(x,y)$.

In some embodiments, the method can further comprises determining the surface powers and cylinder powers using ray tracing for the lens in an as-worn position. The method can further comprise determining the surface powers and cylinder powers using ray tracing for the lens in an as-worn position.

In some embodiments, the design can comprise a peak, unwanted astigmatism equal to about 0.8*add power. The design can comprise a reading width >5.7 mm. the design can comprise a reading area defined by a peak power within 2 mm of a near reference point. The design can comprise a base power+add power+0.05 diopters<maximum power<a base power+an add power+0.15 diopters. The design can comprise one or more lines of a constant power near a reading zone, the one or more lines are nominally elliptical in shape having a power decreasing in all directions from a peak defined by a peak power within 2 mm of a near reference point and a base power+add power+0.05 diopters<maximum power<a base power+an add power+0.15 diopters. The design can comprise a surface area having unwanted astigmatism above (0.9*add power)*0.6<500 mm2. The design can comprise a distance width>40 mm, wherein the distance width is defined by a cylinder power of 0.5 diopters. The design can comprise a distance width of >150-167*(addpower)+69*(add power)2-9.7*(add power)3 for sphere powers of about 0 diopters or >175-199*(addpower)+96*(add power)2-12.5*(add power)3 for sphere powers about 2.5 diopters or >150-174*(addpower)+75.8*(add power)2-11.1*(add power)3 for sphere powers about −2.5 diopters. The design can comprise a near reference point at about 15 mm below a fitting point. The design can comprise a channel length about 12 mm in length.

The invention also relates to the production of progressive addition lenses designed using scaled surface powers and/or cylinder powers of a base curve to determine a set of power targets, and determining a first design using at least one of the targets. The lens may also be produced using the steps of: a.) providing a first design for a progressive addition surface; b.) calculating a scaled surface power and scaled cylinder power for each of a plurality of base curves; c.) using the scaled surface and cylinder powers to generate a set of power and cylinder targets; and d.) optimizing the first design using the power and cylinder targets to produce a second, optimized design.

DESCRIPTION OF DRAWINGS

FIG. 6a is a power map of a progressive addition lens.
FIG. 6b is a cylinder map of a progressive addition lens.
FIG. 7a is a power map of a progressive addition lens.
FIG. 7b is a cylinder map of a progressive addition lens.

DETAILED DESCRIPTION

Figure 1:
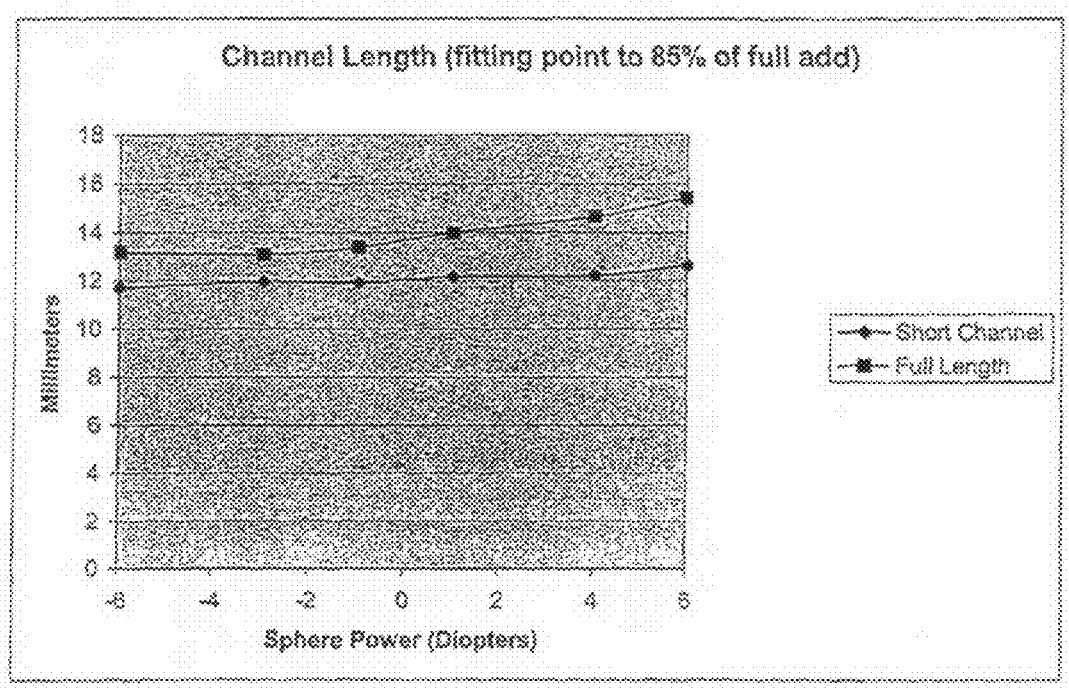
FIG. 1 is a graph depicting the channel lengths of a series of progressive addition lenses.

The present invention provides lenses, and methods for their design and manufacture, in which the length of the channel is shortened while the design performance of each of the distance, near and intermediate viewing zones is comparable to PALs having longer channel lengths. Alternatively, the method of the invention can be used to increase the channel length.

In some embodiments, the invention provides a method for designing a progressive addition lens, comprising, consisting essentially of, and consisting of: a.) providing a first design for a progressive addition surface; b.) calculating a scaled surface power and a scaled cylinder power for each of a plurality of base curves; c.) using the scaled surface and cylinder powers to generate a set of power and cylinder targets; and d.) optimizing the first design using the power and cylinder targets.

By "progressive addition surface" or "progressive surface" is meant a continuous, aspheric surface having distance and near viewing zones, and a zone of increasing dioptric power connecting the distance and near zones. One ordinarily skilled in the art will recognize that, if the progressive surface is the convex surface of the lens, the distance vision zone curvature will be less than that of the near zone curvature and if the progressive surface is the lens' concave surface, the distance curvature will be greater than that of the near zone.

By "channel" is meant a corridor of vision the width of which is the area of vision that is free of unwanted astigmatism of about 0.75, preferably about 1.00, diopters or greater when the wearer's eye is scanning through the intermediate vision zone to the near vision zone and back and the length is the area between the fitting point and the point along the prime meridian of the lens at which the power reaches 85% of the lens' add power.

By "unwanted astigmatism" is meant astigmatism that is undesirable and is introduced or caused by the lens surface. For purposes of the invention, the areas of unwanted astigmatism considered are those located on either side of the channel and preferably below the fitting point. By "fitting point" is meant the point on a lens aligned with the wearer's pupil in its distance viewing position when the wearer is looking straight ahead.

The method of the invention may be used to design any progressive lens. However, the method may find its greatest utility in the design of progressive lenses in which the corridor length is less than about 12 mm.

In the first step of the method of the invention, a first design for a progressive surface is provided by any convenient optical design method. In carrying out the method of the invention, designing of the surface may be carried out by any convenient method including, without limitation, those described in U.S. Pat. Nos. 5,886,766 and 6,302,540 incorporated herein in their entireties by reference. Optimization of the surface may be carried out by any convenient method. Additional properties of a specific lens wearer may be introduced into the design optimization process including, without limitation, variations in the pupil diameter of about 1.5 to about 7 mm, image convergence at a point about 25 to about 28 mm behind the front vertex of the surface, pantoscopic tilt of about 7 to about 20 degrees and the like, and combinations thereof.

The distance and near vision powers for the surface design are selected so that powers of the lens are those needed to correct the lens wearer's visual acuity. The dioptric add power for the surfaces will typically be about +0.10 to about +6.00 diopters. Generally, the distance curvature of the progressive surfaces will be within about 0.25 to about 8.50 diopters. The near vision curvature will be about 1.00 to about 12.00 diopters.

In a second step of the method of the invention, a scaled surface power $P(x,y)$ and a scaled cylinder power $C(x,y)$ are calculated for each of a plurality of base curves. The calculations are carried out using the nominal surface power, $p(x,y)$ and nominal cylinder power $c(x,y)$ for the first design. Preferably, the calculation is carried out as follows:

$$P(x,y)=p(x',y')$$

$$C(x,y)=c(x',y')$$

wherein x'=x/x_scale; and
y'=(y−shift)/y_scale+shift.

By "base curves" is meant the aspects describing the curvature present in each point of the surface design. The design is a combination of base curves. Base curves can be a described by a radius of curvature for each coordinate (x,y).

The x_scale may be about 0.7 to about 1.3 and preferably is about 1. The shift may be about −6 to about 0 and preferably is about −3. If y<shift, then:

$$y\_scale = \frac{New\_channel\_length + shift}{Original\_channel\_length + shift}$$

If y≧shift then y_scale=1.

In other words, the y positions of the power and cylinder values in the intermediate and near viewing zones, or those below y=shift, are linearly scaled to shorten or lengthen, as the case may be, the lower portion of the lens by a factor, y_scale, so that the channel length is decreased or increased from Original_channel_length to New_channel_length. The variable "shift" is used to control the location above which the design changes are held to a minimum. The variable x_scale may be used to increase or decrease the widths of design features and maybe made a function of y to better control the final design.

The scaled surface and cylinder powers are used to generate power and cylinder targets. These targets are then used as inputs to an optimizer to optimize the first design. The optimization may be carried out by any convenient method, for example as set forth in United States Published Application No. 20040263778 incorporated herein in its entirety by reference. Preferably, the optimizer determines the surface that minimizes the function:

$$MF = \sum_x \left[ \sum_y \left[ \begin{array}{l} w\_p(x, y) \cdot (P(x, y) - \Phi(x, y))^2 + \\ w\_c(x, y) \cdot (C(x, y) - cyl(x, y))^2 \end{array} \right] \right]$$

wherein x and y are points sampled over the surface of the lens;
$\Phi(x, y)$ is the surface power calculated as each point x,y;
cyl(x,y) is the surface cylinder calculated as each point (x,y);
w_p(x,y) is the power weight; and
w_c(x,y) is the cylinder weight.

The above-described method will find utility in designing progressive addition lenses (PALs) in which one surface is a progressive surface or in which both the front and back surface of the lens are progressive surfaces or dual-add lenses. As an alternative method for designing dual add lenses, the power and cylinder values for the scaling and optimization process may be calculated by a ray trace method for the lens in the as-worn position. Either or both surfaces may then be optimized to minimize the value of the merit function.

As a second alternative method for designing dual add lenses, the front and back surfaces of a dual add lens may be combined to form a single progressive surface, which surface is a composite of the front and back progressive surface. The surfaces may be combined using any convenient method including, without limitation, sag addition or the method disclosed in U.S. application Ser. No. 10/870,080 incorporated herein in its entirety by reference. The composite surface, or the Scaled_Composite, then may be scaled and optimized as set forth above to provide a single progressive surface with an altered channel length. The other surface for the lens may then by calculated as:

Second_Surface=Scaled_Composite−First_Surface+Second_Spherical wherein First_Surface is the desired front or back surface design to be combined with the new Second_Surface resulting in a dual add PAL with the altered channel length, and Second_Spherical is the spherical portion of the Second_Surface.

By "sag addition" is meant that two surfaces can be added such that the resulting point is the sum of the corresponding points of the two surfaces. Said differently, "z(x,y) of surface 3"="z(x,y) of surface 1"+"z(x,y) of surface 2".

In a preferred embodiment, the lenses of the invention have the following characteristics, which characteristics are provided in terms of the power and unwanted astigmatism as determined using ray trace analysis:

1. For sphere powers that are from about −2.5 diopters to about +2.0 diopters the peak, unwanted astigmatism is approximately equal to 0.9*add power.

2. For add powers in the range of about 2.0 to about 2.5 diopters, the reading width, defined by 0.25 diopters drop in mean sphere power at the near reference point, is >5.7 mm. A near reference point is the location where the addition of the lens is observed. For add powers less than 2.0 diopters, the reading width in millimeters is >(19−7*add power). For add powers greater than 2.5 diopters, the reading width is >5 mm.

3. For all sphere and add powers, the reading area is defined by a peak power within 2 mm of the near reference point.

4. For all sphere and add powers, the base power+add power+0.05 diopters<maximum power<base power+add power+0.15 diopters.

5. For all sphere and add powers, the lines of constant power near the reading zone are nominally elliptical in shape with power decreasing in all directions from the peak defined by characteristics 3 and 4 above.

6. For sphere powers that are about 0 diopters, the surface area with unwanted astigmatism above (0.9*add power) *0.6<500 mm2.

7. For all sphere and add powers, the distance width, as defined by a cylinder power of 0.5 diopters, is >40 mm.

8. The distance width, as defined by 0.5 diopters at the distance reference point, is >150-167*(addpower)+69*(add power)2-9.7*(add power)3 for sphere powers of about 0 diopters. For sphere powers about 2.5 diopters, the distance width is >175-199*(addpower)+96*(add power)2-12.5*(add power)3. For sphere powers about −2.5 diopters, the distance width is >150-174*(addpower)+75.8*(add power)2-11.1*(add power)3

9. For all sphere and add powers, the near reference point is located 15 mm below the fitting point.

10. The channel length, as defined by the distance from the fitting point to 85% of the add power at the near reference point, is approximately 12 mm.

The lenses of the invention may be constructed of any known material suitable for production of ophthalmic lenses. Such materials are either commercially available or methods for their production are known. Further, the lenses may be produced by any conventional lens fabrication technique including, without limitation, grinding, whole lens casting, molding, thermoforming, laminating, surface casting, or combinations thereof. Preferably, in the production of dual add lenses, one progressive surface of the lens is formed by casting a lens blank with the progressive surface and the opposite side progressive surface is formed by machining.

The invention will be clarified further by a consideration of the following, non-limiting examples.

EXAMPLE

A dual add lens is designed using the method of the invention as follows. For each base curve and add power, front and back surfaces of DEFINITY™ lenses are used to create a composite front surface using the method disclosed in U.S. application Ser. No. 10/870,080. The composite surface is then scaled with x_scale=1, the shift=−3, the Original_channel_length=13.5 and the New_channel length=12.0. A new back surface, Second_Surface, is calculated by:

Second_Surface=Scaled_Composite−First_Surface+Second_Spherical wherein First_Surface is the original front surface for the conventional dual add lens and the Second-Spherical is the spherical portion of the Second_Surface.

For purposes of this example, a set of front surfaces is common to both the conventional and the short channel designs. The back surface is different.

FIGS. 1 through 5 show summaries of ray trace analysis of the 2.0 diopter add power across sphere powers from −6 to +6 diopters for both the conventional and shortened channel designs. FIGS. 6 and 7 are power and cylinder maps, for the 2.00 add, 0.0 diopters sphere designs for the conventional and short channel designs, respectively.

In FIGS. 8 through 12 are shown the results of comparisons of the two designs from 1 to 3 diopters add power and 0.0 diopters sphere power. In these figures, the dashed line represents the conventional design and the solid line is for a short corridor design of the invention.

Figure 2:
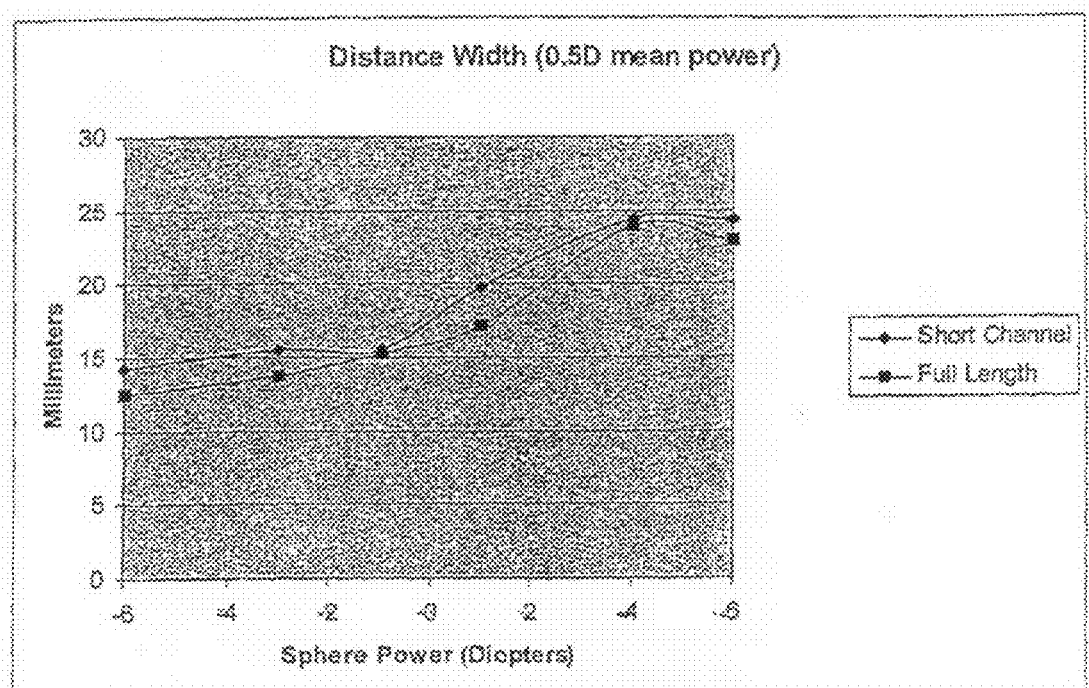
FIG. 2 is a graph depicting the width of the distance portion of a series of progressive addition lenses.
Figure 3:
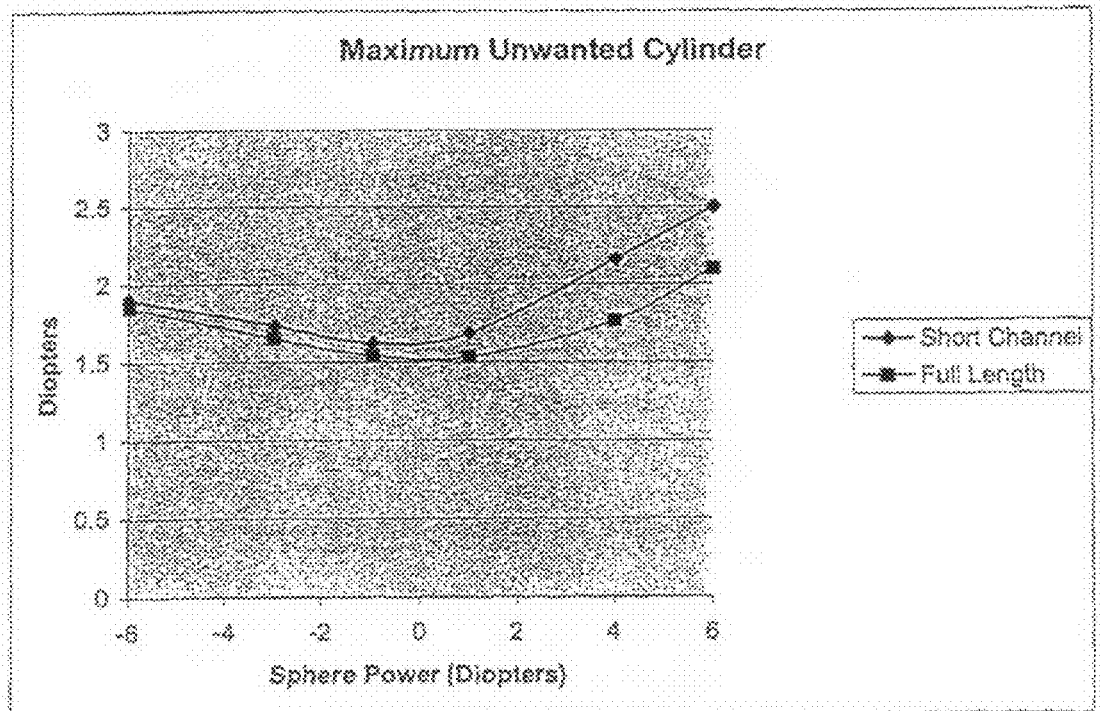
FIG. 3 is a graph depicting the maximum unwanted astigmatism of a series of progressive addition lenses.
Figure 8:
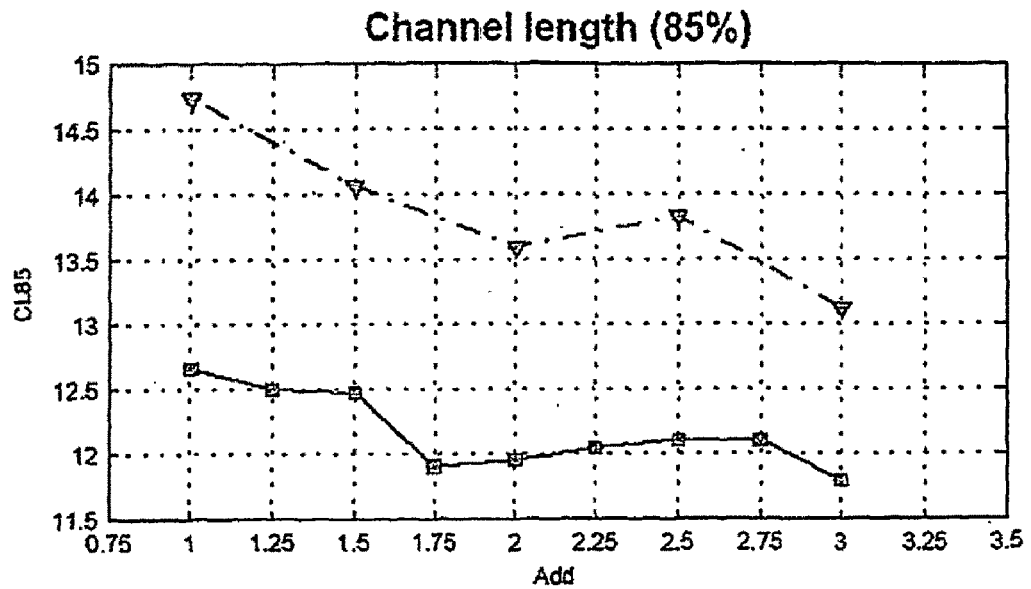
FIG. 8 is a graph depicting the channel lengths of a series of lenses.
Figure 9:
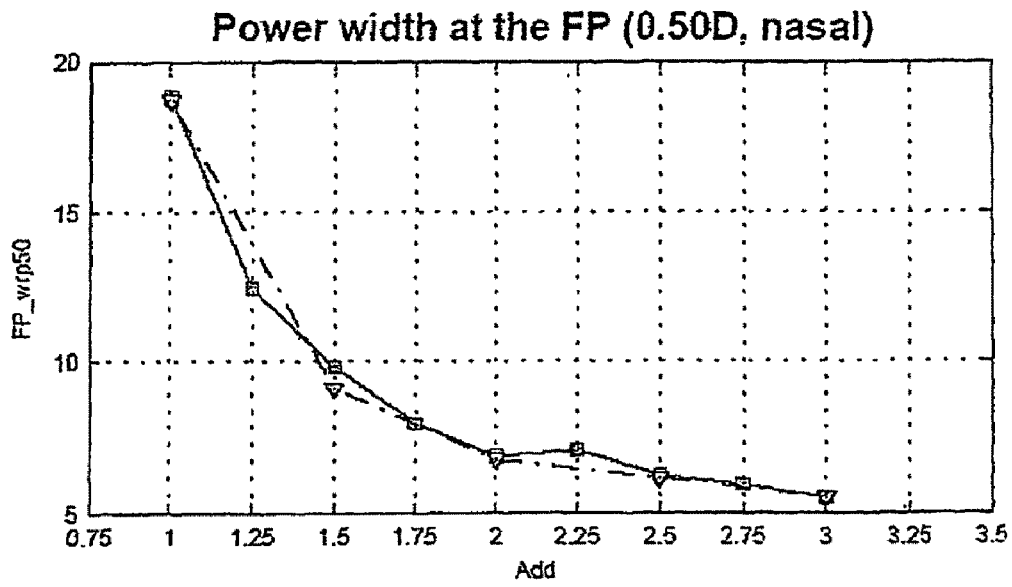
FIG. 9 is a graph depicting the distance widths of a series of lenses.
Figure 10:
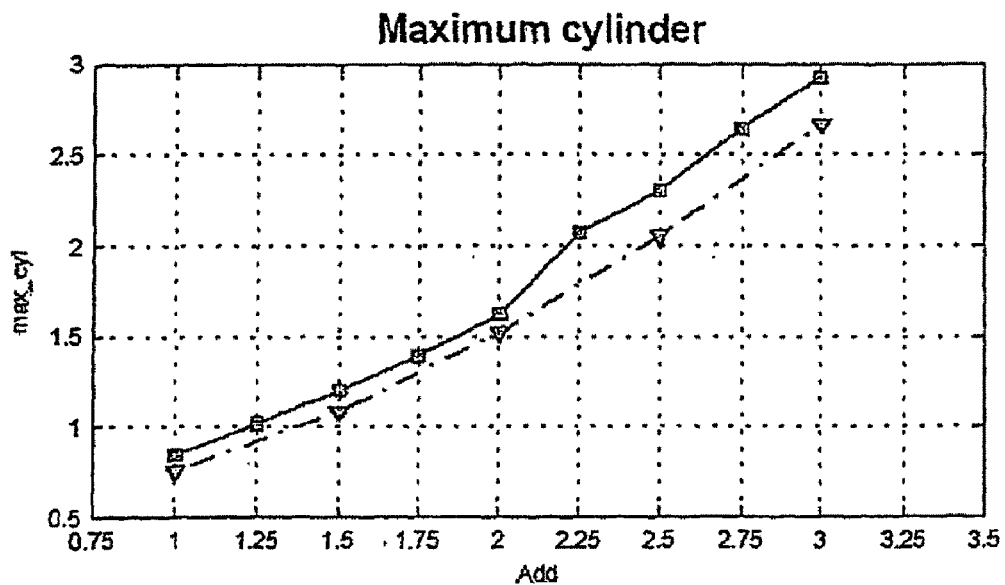
FIG. 10 is a graph depicting the maximum unwanted astigmatism of a series of lenses.

As shown in FIGS. 1 and 8, the channel length for the new design is shortened. FIGS. 2 and 9 show that the shortened design has a distance width substantially equivalent to the original design, while FIGS. 3 and 10 show that the maximum unwanted astigmatism is greater in the short channel design.

Figure 4:
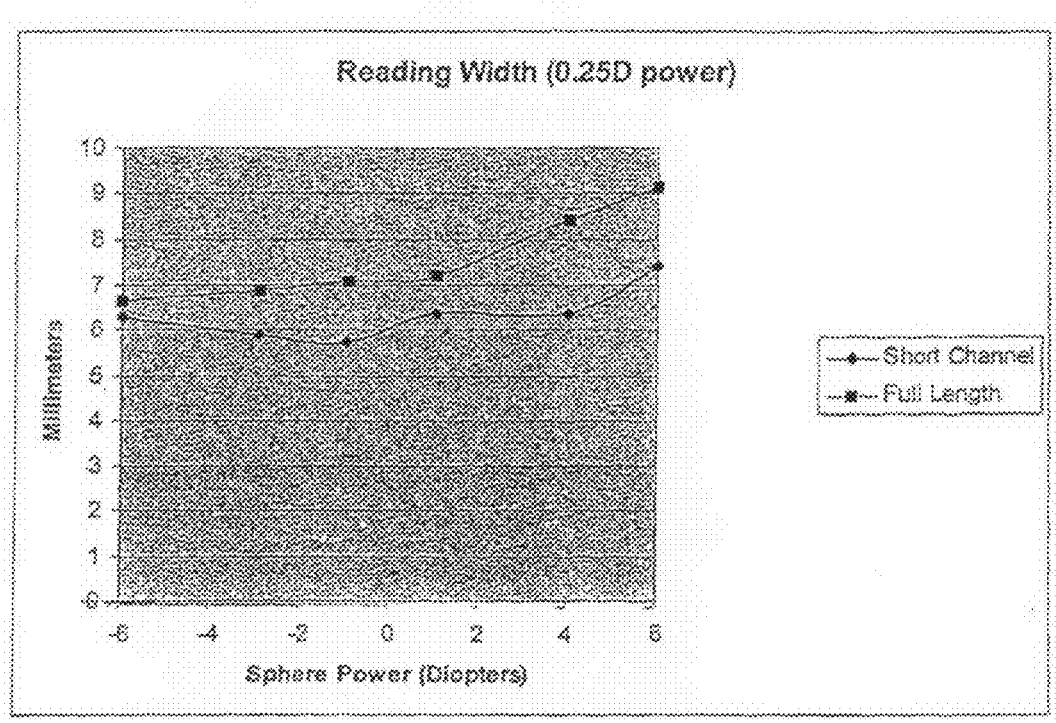
FIG. 4 is a graph depicting the reading widths of a series of progressive addition lenses.
Figure 5:
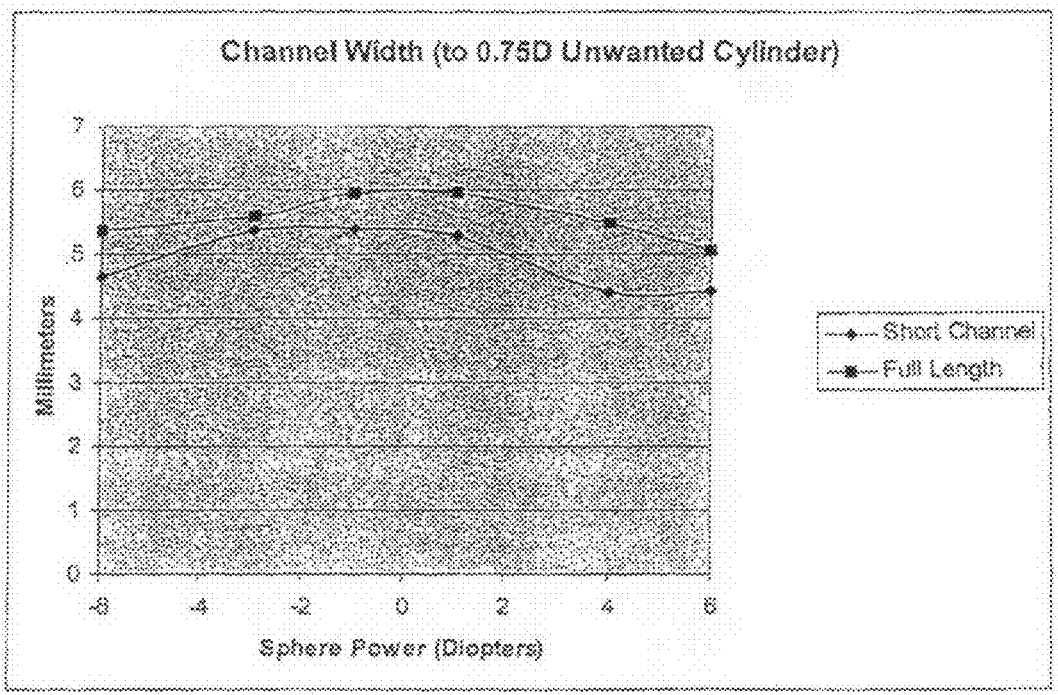
FIG. 5 is a graph depicting the channel widths of a series of progressive addition lenses.
Figure 11:
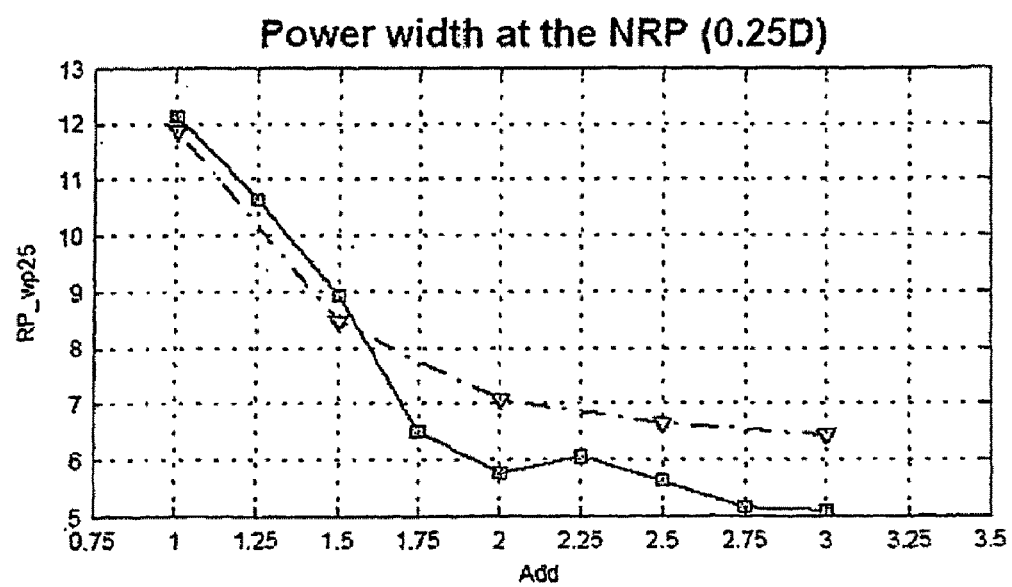
FIG. 11 is a graph depicting the reading widths of a series of lenses.
Figure 12:
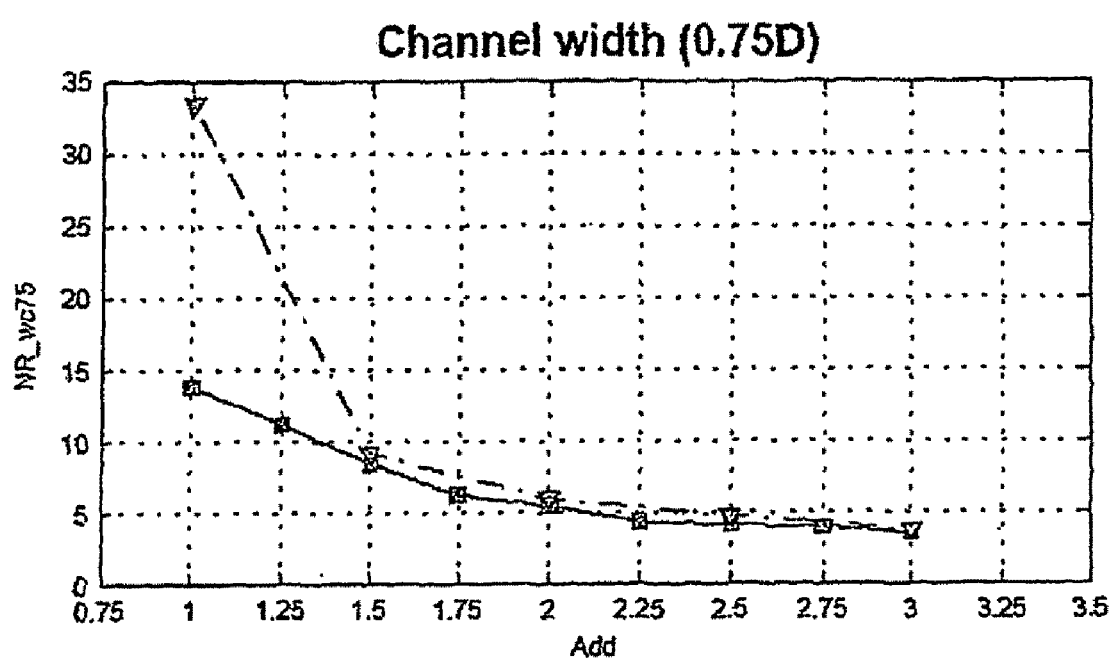
FIG. 12 is a graph depicting the channel widths of a series of lenses. Like reference symbols in the various drawings indicate like elements.

The reading width, measured at the width near the near reference point to a drop in power of 0.25 diopters, as shown in FIGS. 4 and 11 shows some compromise. However, this reading width can be traded off with the size of the peaks of unwanted astigmatism and the intermediate channel width by adjustment of the value in the x_scale for values of y that are less than shift. The intermediate channel width, or the width where there is 0.75 diopters of unwanted astigmatism at the narrowest location, is shown in FIGS. 5 and 12.

The resulting design had a near reference point located at or below 15 mm below the fitting point and the channel length was approximately 12 mm. The design showed small changes in the distance performance along with some compromise in the peak values of unwanted astigmatism, intermediate channel width and reading width. The distance width defined by 0.5 diopters of cylinder is greater than 30 mm and the width defined by 0.25 diopters sphere at the fitting point is greater than 11 mm. The peak unwanted astigmatism is approximately 0.8*add power for sphere powers near about 0 diopters, but no greater than 0.9*add power.

The surface area with unwanted astigmatism above (0.9*add power)*0.6<500 mm2 for sphere powers near about 0 diopters, the peak of unwanted astigmatism is small providing a region near the lens' periphery with clear vision. The reading width, defined as a 0.25 diopters drop in mean sphere power at the near reference point is greater than 5.7 and the reading area is defined by a peak power within 2 mm of the near reference point.

For the design, the base power+the add power+0.05 diopters<maximum power<base power+add power+0.15 diopters. Additionally, the lines of constant power near the reading zone are nominally elliptical in shape with the power falling off in all directions from the peaks.

A number of embodiments of the invention have been described. Nevertheless, it will be understood that various modifications may be made without departing from the spirit and scope of the invention. Accordingly, other embodiments are within the scope of the following claims.

What is claimed is:

1. A method for designing a progressive addition lens, comprising the steps of:
   a.) providing a first design for a progressive addition surface which includes a nominal surface power and a nominal cylindrical power that at least in part determine a channel length;
   b.) calculating a scaled surface power and scaled cylinder power for each of a plurality of base curves based on the nominal surface power and the nominal cylindrical power, so that the channel length is decreased or increased;
   c.) using the scaled surface and cylinder powers to generate a set of power and cylinder targets; and
   d.) optimizing the first design using the power and cylinder targets to produce a second optimized design, wherein the scaled surface power or cylinder powers are determined in step b) according to the following equations:

$$P(x,y) = p(x',y')$$

$$C(x,y) = c(x',y')$$

Wherein $P(x,y)$ is a scaled surface power;
$p(x',y')$ is a nominal surface power;
$C(x,y)$ is a scaled cylinder power;
$c(x',y')$ is a nominal cylinder power $x' = x/x\_scale$; and
$y' = (y-shift)/y\_scale + shift$.

2. The method of claim 1, wherein x_scale is 0.7 to 1.3 and the shift is −6 mm to 0 mm.

3. The method of claim 1, wherein x_scale is 1 and the shift is −3 mm.

4. The method of claim 1, wherein step d.) further comprises optimizing by determining a surface that minimizes the function:

$$MF = \sum_x \left[ \sum_y \left[ \begin{array}{l} w\_p(x,y) \cdot (P(x,y) - \Phi(x,y))^2 + \\ w\_c(x,y) \cdot (C(x,y) - cyl(x,y))^2 \end{array} \right] \right]$$

wherein x and y are points sampled over the surface of the lens;
$w\_p(x,y)$ is a power weight;
$P(x,y)$ is a scaled surface power;
$\Phi(x,y)$ is a surface power calculated at each point (x,y);
$w\_c(x,y)$ is a cylinder weight;
$C(x,y)$ is a scaled cylinder power; and
$cyl(x,y)$ is the surface cylinder calculated as each point (x,y).

5. The method of claim 1, further comprising determining the surface powers and cylinder powers using ray tracing for the lens in an as-worn position.

6. The method of claim 4, further comprising determining the surface powers and cylinder powers using ray tracing for the lens in an as-worn position.

7. The method of claim 1, wherein the second design comprises a peak, unwanted astigmatism equal to 0.8*add power.

8. The method of claim 1, wherein the second design comprises a reading width >5.7 mm.

9. The method of claim 1, wherein the second design comprises a reading area defined by a peak power within 2 mm of a near reference point.

10. The method of claim 1, wherein the second design comprises a base power+add power+0.05 diopters<peak power<a base power+an add power+0.15 diopters.

11. The method of claim 1, wherein the second design comprises one or more lines of a constant power near a reading zone, the one or more lines are nominally elliptical in shape having a power decreasing in all directions from a peak defined by a peak power within 2 mm of a near reference point and a base power+add power+0.05 diopters<peak power<a base power+an add power+0.15 diopters.

12. The method of claim 1, wherein the second design comprises a surface area having unwanted astigmatism above (0.9*add power)*0.6 that is <500 mm$^2$.

13. The method of claim 1, wherein the second design comprises a distance width >40 mm, wherein the distance width is defined by a cylinder power of 0.5 diopters.

14. The method of claim 1, wherein the second design comprises a distance width of >150-167*(addpower)+69*(add power)$^2$-9.7*(add power)$^3$ for sphere powers of 0 diopters or >175-199*(addpower)+96*(add power)$^2$-12.5*(add power)$^3$ for sphere powers 2.5 diopters or >150-174*(addpower)+75.8*(add power)$^2$-11.1*(add power)$^3$ for sphere powers -2.5 diopters, where the distance width has units of mm for add powers expressed in units of dioptres.

15. The method of claim 1, wherein the second design comprises a near reference point at 15 mm below a fitting point.

16. The method of claim 1, wherein the second design comprises a channel length 12 mm in length.

17. The method of claim 1, wherein the second optimized design comprises one or more of:
- a.) a peak, unwanted astigmatism, equal to 0.8*add power;
- b.) a reading width >5.7 mm;
- c.) a reading area defined by a peak power within 2 mm of a near reference point;
- d.) a base power+add power+0.05 diopters<peak power<based power+add power+0.15 diopters;
- e.) one or more lines of a constant power near a reading zone, wherein the one or more lines are nominally elliptical in shape having a power decreasing in all directions from a peak defined by characteristics c.) and d.);
- f.) a surface area having an unwanted astigmatism above (0.9*add power)*0.6 that is <500 mm$^2$;
- g.) a distance width >40 mm, wherein the distance width is defined by a cylinder power of 0.5 diopters;
- h.) a distance width of >150-167*(addpower)+69*(add power)$^2$-9.7*(add power)$^3$ for sphere powers of 0 diopters or >175-199*(addpower)+96*(add power)$^2$-12.5*(add power)$^3$ for sphere powers 2.5 diopters of >150-174*(addpower)+75.8*(add power)$^2$-11.1*(add power)$^3$ for sphere powers -2.5 diopters, where the distance width has units of mm for add powers expressed in units of dioptres;
- i.) a near reference point at 15 mm below a fitting point; and
- j.) a channel length 12 mm in length.

* * * * *